United States Patent [19]
Yamamoto et al.

[11] Patent Number: 4,800,661
[45] Date of Patent: Jan. 31, 1989

[54] ELECTRIC IRON

[75] Inventors: Hiroshi Yamamoto, Niigata; Masaru Ishida, Kamo; Jin Watanabe, Niigata; Takashi Ishiwatari, Kamo; Kazuharu Tubaki, Niigata; Shinichi Nakanishi, Aichi, all of Japan

[73] Assignee: Toshiba Heating Appliances Co., Ltd., Kamo, Japan

[21] Appl. No.: 50,567

[22] Filed: May 18, 1987

[30] Foreign Application Priority Data

May 20, 1986 [JP] Japan .................. 61-115574
Sep. 12, 1986 [JP] Japan .................. 61-214109

[51] Int. Cl.$^4$ .................................. D06F 75/38
[52] U.S. Cl. .................................. 38/93
[58] Field of Search ............... 38/93; 428/422, 323

[56] References Cited

U.S. PATENT DOCUMENTS

| | | | |
|---|---|---|---|
| Re. 31,448 | 11/1983 | Attwood et al. | 428/422 |
| 3,501,360 | 3/1970 | Mancel | 428/422 X |
| 3,900,684 | 8/1975 | Edwards et al. | 428/421 |
| 3,981,945 | 9/1976 | Attwood et al. | 228/422 X |
| 4,039,713 | 8/1977 | Vassiliou | 428/422 X |
| 4,090,993 | 3/1978 | Attwood et al. | 260/29.6 |
| 4,104,225 | 8/1978 | Conbere | 260/29.6 F |
| 4,131,711 | 12/1978 | Attwood | 428/422 |
| 4,228,219 | 10/1980 | Hoy et al. | 428/422 |
| 4,462,173 | 7/1984 | Sato | 38/93 |
| 4,621,026 | 11/1986 | Robinson | 428/422 |

FOREIGN PATENT DOCUMENTS

| | | |
|---|---|---|
| 52-11660 | 3/1977 | Japan . |
| 57-60688 | 4/1982 | Japan . |
| 57-105096 | 6/1982 | Japan . |
| 57-206561 | 12/1982 | Japan . |
| 57-203497 | 12/1982 | Japan . |
| 57-202683 | 12/1982 | Japan . |
| 59-43038 | 12/1984 | Japan . |

*Primary Examiner*—Ronald Feldbaum
*Attorney, Agent, or Firm*—Oblon, Fisher, Spivak, McClelland & Maier

[57] ABSTRACT

Disclosed is an electric iron including a heat-radiating base. A coating is formed on the lower side of the heat-radiating base. The coating is formed by mixing conductive fine powder and a polyethersulfone resin with a polytetrafluoroethylene resin.

4 Claims, 3 Drawing Sheets

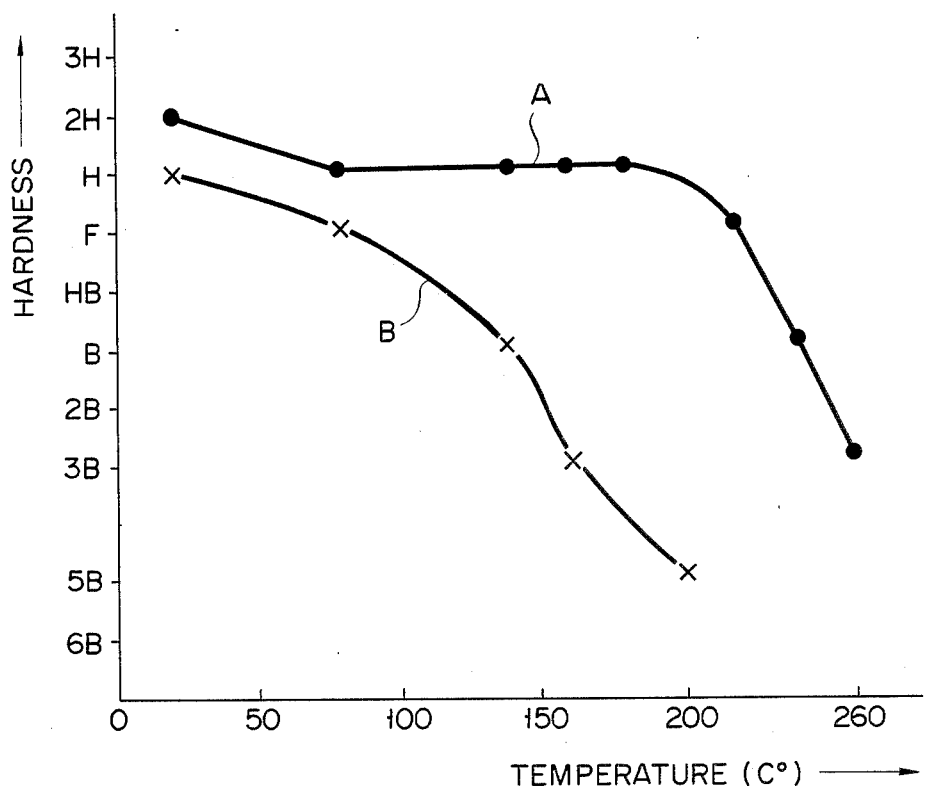
F I G. 6
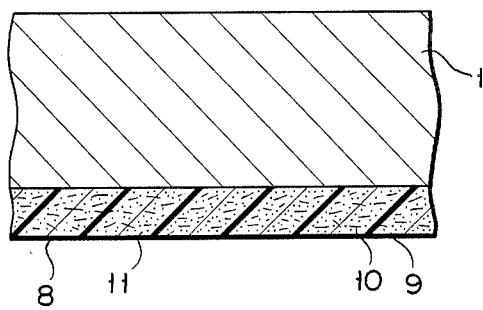
F I G. 7

ELECTRIC IRON

BACKGROUND OF THE INVENTION

1. Field of the Invention

The prsent invention relates to an electric iron used for ironing clothes.

2. Discussion of the Background

An electric iron has a heat-radiating base, which is heated by a heater. The iron is slid over the clothes while pressing the lower side of the heat-radiating base against the clothes. Generally, the heat-radiating base is formed of aluminum or its alloy, and the lower side of the base is coated with a polytetrafluoroethylene resin, so as to provide an anti-corrosive and non-stick surface.

However, if the base of an electric iron has such a coating as mentioned above, the following problem occurs. When the base is slid over clothes while being pressed against them, both the coating of the base and the clothes are charged with static electricity, due to the friction between the two. Since the static electricity causes attraction, the clothes may cling to the base of the iron, preventing smooth ironing. This problem is marked particularly when the clothes are thin.

The heat-radiating base of an electric iron is heated to 150°-200° C. during use. However, if a polytetrafluoroethylene resin is heated to this range of temperature, its hardness will deteriorate, as indicated by curve B in FIG. 6. Accordingly, if the coating on the heat-radiating base is formed of a polytetrafluoroethylene resin, it will wear away in a relatively short period of time, due to the friction between the coating of the base and the clothes. In addition, the clothes may become more apt to cling to the base.

SUMMARY OF THE INVENTION

Accordingly, one object of the present invention is to provide an electric iron which can prevent clothes from clinging to the heat-radiating base of the iron, thereby ensuring smooth ironing.

Another object of the present invention is to provide an electric iron, the heat-radiating base of which has a coating that does not deteriorate in spite of long use of the iron.

BRIEF DESCRIPTION OF THE DRAWINGS

FIG. 6 is a graph showing the relationships between the hardness and temperature of the coating used in the second embodiment, the coating used in the present invention and that used in the prior art being compared with each other in the graph; and FIG. 7 is a sectional view of part of the heat-radiation base used in the third embodiment of the present invention.

DETAILED DESCRIPTION OF THE PREFERRED EMBODIMENT

Figure 1:
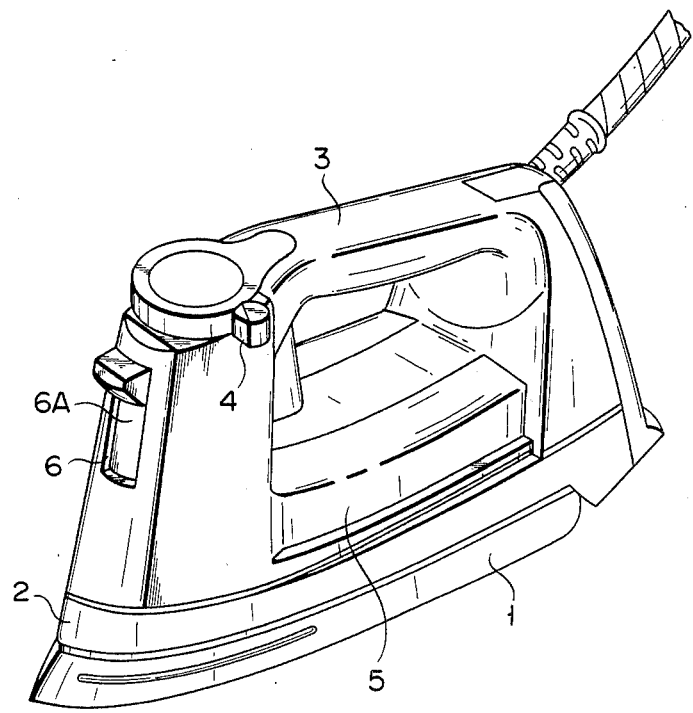
FIG. 1 is a perspective view illustrating the outward appearance of the electric of iron according to one embodiment of the present invention.

As is shown in FIG. 1, the electric iron of the first embodiment of the present invention comprises heat-radiating base 1. This heat-radiating base is formed of either aluminum or its alloy. Handle 3, formed of a synthetic resin, is attached to the upper side of heat-radiating base 1, with heat-insulating cover 2 interposed. At the upper end of the front section of handle 3 is temperature control button 4, by which the temperature of heat-radiating base 1 is controlled. Water tank 5 is provided on the front end of handle 3, and water fill opening 6 is formed in the front face of water tank 5. The water in tank 5 drop into an evaporating chamber (not shown) formed on the upper side of heat-radiating base 1, and is changed into steam in that chamber. The steam is jetted from steam vents (not shown), which are formed in the lower side of heat-radiating base 1. Cover 6A is attached to water filling port 6 of water tank 5, so as to permit water filling port 6 to be closed.

Figure 2:
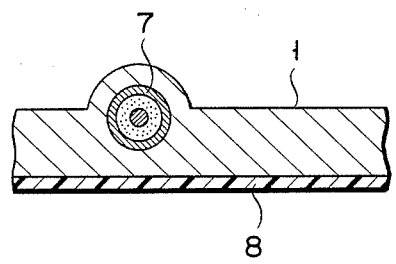
FIG. 2 is sectional view of the heat-radiating base of the electric iron.

As is shown in FIG. 2, heater 7 is embedded in heat-radiating base 1. When the electric iron is powered, the temperature of heat-radiating base 1 increased by the heat generated by heater 7, but it can be maintained at a constant value by use of temperature control button 4. Coating 8 is formed on the lower side of heat-radiating base 1.

Figure 3:
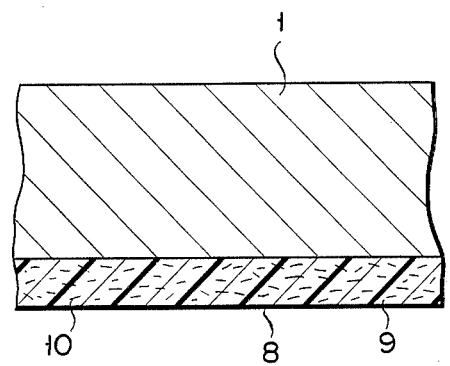
FIG. 3 is an enlarged, sectional view of part of the heat-radiating base.

As is shown in FIG. 3, coating 8 is formed of a mixture of polytetrafluoroethylene resin 9 and conductive fine powder, such as aluminum powder 10 including scale-shaped grains with a length of about 10 to 50 $\mu$m. Aluminum powder 10 is uniformly distributed in polytetrafluoroethylene resin 9 such that it accounts for 5 to 15% by weight of the mixture. In order to form coating 8 on the lower side of heat-radiating base 1, polytetrafluoroethylene resin 9 and aluminum powder 10 are mixed with each other, first of all. Solvent is used to obtain a solution of the mixture. After spraying this solution on the lower side of heat-radiating base 1, this base is subjected to heat treatment at about 400° C., for burning.

With an electric iron with such a heat-radiating base as noted above, it is likely that coating 8 will be charged with static electricity, after using the iron for a certain time. If coating 8 is charged with static electricity, however, the electricity will be quickly discharged into heat-radiating base 1 since conductive aluminum powder 10 is distributed in coating 8. The static electricity does not remain in coating 8, so that clothes are prevented from clinging to heat-radiating base 1, thus ensuring smooth ironing.

Figure 4:
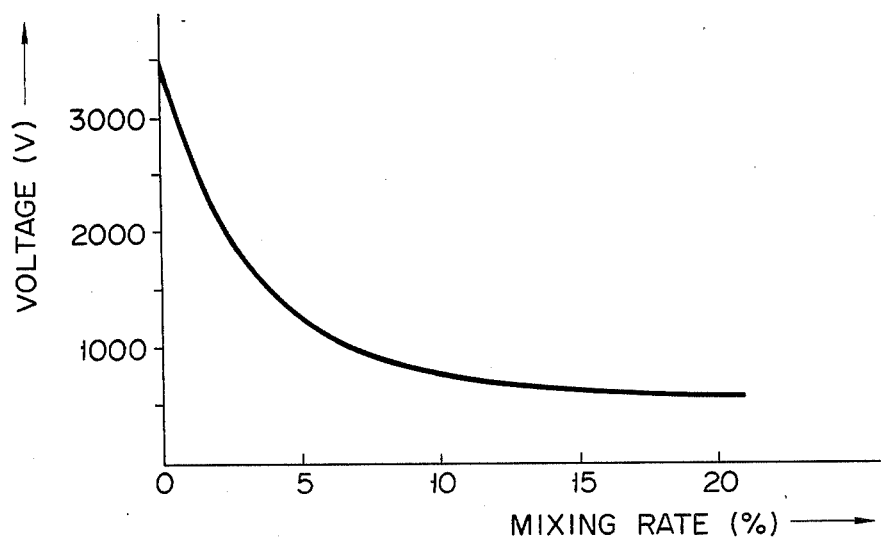
FIG. 4 is a graph showing the relationships between the voltage induced in the coating and the mixing rate of aluminum powder.

FIG. 4 is a graph illustrating the relationships between the mixing rate of aluminum powder 10 in polytetrafluoroethylene resin 9 and the voltage induced in coating 8 after the iron is slid 10 cm to and fro ten times (0.5 seconds from one time) while pressing the lower side of coating 8 against clothes. As can be seen from FIG. 4, if the content of aluminum powder 10 in resin 9 is about 5% or more, the voltage induced in coating 8 is sufficiently low. However, if aluminum powder 10 is added too much, the amount of resin 10 in coating 8 will be too small. In this case, it is impossible to obtain a sufficiently anticorrosive and non-stick surface. Therefore, the mixing rate of aluminum powder 10 is preferably within the range 5 to 15%.

The conductive fine powder need not be aluminum. Conductive metallic materials such as nickel and stainless steel, or conductive non-metallic materials such as carbon black and carbon fibers may be used, instead of aluminum. Furthermore, heat-radiating base 1 need not be formed of aluminum or its alloy. Zinc alloy or stainless steel may be used, if so desired.

Figure 5:
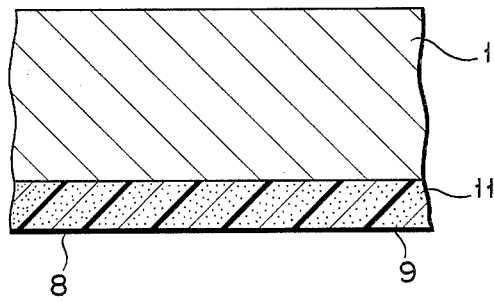
FIG. 5 is a sectional view of the heat-radiating base used in the second embodiment of the present invention.

FIG. 5 illustrates heat-radiating base 1 used in the second embodiment of the present invention. According to the second embodiment, coating 8, located on the lower side of heat-radiating base 1, is formed of a mixture of polytetrafluoroethylene resin 9 and polyethersulfone resin 11. Each of these resins accounts for 50% by weight of the mixture. In order to form coating 8 on the lower side of heat-radiating base 1, polytetrafluoroethylene resin 9 and polyethersulfone resin 11 are mixed with each other at a mixing rate of 50:50, first of all. Solvent is used to obtain a solution of the mixture. After spraying this solution on the lower side of heat-radiating base 1, this base is subjected to heat treatment of about 400° C., for burning.

Curve A in FIG. 6 indicates the hardness of coating 8 formed of the mixture of polytetrafluoroethylene resin 9 and polyethersulfone resin 11, with reference to temperature. As indicated, coating 8 is as hard as the lead of a pencil at the normal temperature; the hardness of coating 8 is about "2H". This hardness does not much vary until the temperature is raised to 200° C. In other words, the hardness is greater than "H" as long as the temperature is lower than 200° C. This means that coating 8 can be prevented from wearing away after a long period of time. It is, therefore, possible to prevent clothes from clinging to heat-radiating base 1, thus ensuring smooth ironing.

Coating 8 used in the second embodiment can be brought into sufficiently tight contact with the surface of heat-radiating base 1, due to the use of polyethersulfone resin 11. Therefore, coating 8 can be formed directly on the lower side of heat-radiating base 1, without the necessity of using a primer. If coating 8 is formed directly on the lower side of heat-radiating base 1, the step of applying a primer is not necessary, thus simplifying the manufacturing process of the electric iron and lowering the manufacturing cost thereof. In addition, coating 8 formed of the mixture of polytetrafluoroethylene resin 9 and polyethersulfone resin 11 can be colored in a satisfactory manner; it can be easily colored by use of pastel color.

Heat-radiating base 1 used in the second embodiment can be formed of aluminum, an aluminum alloy, a zinc alloy, stainless steel, ceramics, for example.

FIG. 7 illustrates heat-radiating base 1 used in the third embodiment of the present invention. According to the third embodiment, coating 8, located on the lower side of heat-radiating base 1, is formed of a mixture of polytetrafluoroethylene resin 9, polyethersulfone resin 11, and aluminum powder (conductive fine powder) 10. In heat-radiating base 1 having such coating 8, the static electricity which may be generated in coating 8 can be quickly discharged into heat-radiating base 1 through aluminum powder 10. In addition, the temperature of coating 8 can be maintained substantially at a constant value as long as the temperature of heat-radiating base 1 is within the normal range, so that coating 8 does not wear away even if the electric iron is used for a long period of time. Therefore, clothes do not cling to heat-radiating base 1, thus ensuring smooth ironing.

Heat-radiating base 1 used in the third embodiment can be formed of aluminum, an aluminum alloy, a zinc alloy, stainless steel, or the like. Further, the conductive fine powder is not limited to aluminum powder. It may be formed of conductive metallic materials such as nickel and stainless steel, or conductive non-metallic powder such as carbon black and carbon fibers.

What is claimed is:

1. In an electric iron having a heat-radiating base, the improvement comprising that the heat-radiating base includes a coating located on a lower side thereof and formed of a mixture consisting essentially of a polytetrafluoroethylene resin and a conductive fine powder, the amount of the conductive fine powder being 5 to 15% by weight based on the amount of the polytetrafluoroethylene resin, wherein the conductive fine powder is formed of a material which is at least one member selected from the group consisting of aluminum, nickel, stainless steels, carbon blacks and carbon fibers.

2. The electric iron of claim 1, wherein the heat-radiating base is formed of a material which is at least one member selected from the group consisting of aluminum, aluminum alloys, zinc alloys and stainless steels.

3. In an electric iron having a heat-radiating base, the improvement comprising that the heat-radiating base includes a coating located on a lower side thereof and formed of a mixture consisting essentially of a polytetrafluoroethylene resin, a conductive fine powder and a polyetheresulfone resin, the amount of the conductive fine powder being 5 to 15% by weight based on the amount of the polytetrafluoroethylene resin, wherein the conductive fine powder is formed of a material which is at least one member selected from the group consisting of aluminum, nickel, stainless steels, carbon blacks and carbon fibers.

4. The electric iron of claim 3, wherein the heat-radiating base is formed of a material which is at least one member selected from the group consisting of aluminum, aluminum alloys, zinc alloys and stainless steels.

* * * * *